(12) United States Patent  (10) Patent No.: US 8,346,383 B2
Eckstein et al.  (45) Date of Patent: Jan. 1, 2013

(54) METHOD FOR DETERMINING THE MACHINING QUALITY OF COMPONENTS, PARTICULARLY FOR METAL CUTTING BY NC MACHINES

(75) Inventors: Martin Eckstein, Puchheim (DE); Günter Breitkopf, München (DE); Rolf Kneilling, Rapperzell (DE)

(73) Assignee: MTU Aero Engines GmbH, Munich (DE)

( * ) Notice: Subject to any disclaimer, the term of this patent is extended or adjusted under 35 U.S.C. 154(b) by 115 days.

(21) Appl. No.: 12/865,946

(22) PCT Filed: Feb. 5, 2009

(86) PCT No.: PCT/DE2009/000159
§ 371 (c)(1),
(2), (4) Date: Nov. 29, 2010

(87) PCT Pub. No.: WO2009/097840
PCT Pub. Date: Aug. 13, 2009

(65) Prior Publication Data
US 2011/0238200 A1  Sep. 29, 2011

(30) Foreign Application Priority Data
Feb. 8, 2008  (DE) .......................... 10 2008 008 470

(51) Int. Cl.
*G06F 19/00*  (2011.01)
(52) U.S. Cl. ....................................... 700/159; 700/110
(58) Field of Classification Search .................. 700/159, 700/169, 110, 192, 104; 409/131, 234; 408/143, 408/141
See application file for complete search history.

(56) References Cited

U.S. PATENT DOCUMENTS

| 4,031,368 A * | 6/1977 | Colding et al. ............... 700/173 |
| 4,532,599 A * | 7/1985 | Smith ............................. 702/82 |
| 4,866,360 A * | 9/1989 | Kolomeets et al. ........... 318/577 |
| 5,070,655 A * | 12/1991 | Aggarwal ........................ 451/5 |

(Continued)

FOREIGN PATENT DOCUMENTS
EP  1376284 A1  1/2004

OTHER PUBLICATIONS

Dolinsek, S., Kopac, J., Viharos, Z. J., Monostori, L., "An Intelligent AE Sensor for the Monitoring of Finish Machining Process", Intelligent Processing and Manufacturing of Materials, 1999. IPMM '99. Proceedings of the Second International Conference on Honolulu, HI, USA Jul. 10-15, 1999, Piscataway, NJ, USA, IEEE, US, Bd. 2, Jul. 10, 1999, Seiten 847-853, XP010351495 ISBN: 978-0-7803-5489-0.

(Continued)

*Primary Examiner* — Kidest Bahta
(74) *Attorney, Agent, or Firm* — Barlow, Josephs & Holmes, Ltd.

(57) ABSTRACT

The present invention relates to a method for determining a selected machining quality of components in a manufacturing process, particularly during metal cutting, having at least the following method steps of determining process-relevant variables by sensors and/or from the data stream in the machine controller, extracting variable curves characteristic for the respective machining process, selecting a number of different characteristics of the extracted variable curves, the linking of which enables a clear assignment to the selected machining quality, and multivariate linking of the selected characteristics to a characteristic pattern correlating with the selected machining quality.

4 Claims, 4 Drawing Sheets

Motor current of the z axis
(feed advance) of an NC drilling machine

U.S. PATENT DOCUMENTS 5,251,144 A * 10/1993 Ramamurthi ................. 700/177
7,706,571 B2 * 4/2010 Das et al. ...................... 382/103
2004/0179915 A1 9/2004 Hill et al.

OTHER PUBLICATIONS

Karali Patra et al., "Drill Wear Monitoring through Current Signature Analysis using Wavelet Packet Transform and Artificial Neural Network", Industrial Technology, 2006. ICIT 2006. IEEE International Conference on, IEEE, PI, Dec. 1, 2006, Seiten 1344-1348, XP031178093 ISBN: 978-1-4244-0725-5.

Bhattacharyya, P. et al., "Current Signal Based Continuous On-line Tool Condition Estimation in Face Milling", IEEE, [Online] 2006, XP002529392 Gefunden im Internet: URL:htp:ieeexplore.ieee.org/stamp/stamp.jsp?arnumber=04237559>.

Ozel, T., et al., "Predictive modeling of surface roughness and tool wear in hard turning using regression and neural networks", International Journal of Machine Tools and Manufacture, Elsevier, US, Bd. 45, Nr. 4-5, Apr. 1, 2005, Seiten 467-479, XP025333653 ISSN: 0890-6955.

* cited by examiner

Motor current of the z axis (feed advance) of an NC drilling machine

Extracted motor current curves of several drilling sequences

Breakdown of a drilling sequence (motor current) in sections and associated characteristic values Surface roughness values of 34 drilled holes

METHOD FOR DETERMINING THE MACHINING QUALITY OF COMPONENTS, PARTICULARLY FOR METAL CUTTING BY NC MACHINES

BACKGROUND OF THE INVENTION

The present invention relates to a method for quality control of components preferably manufactured in serial production and, in particular, a method for determining a selected machining quality (qualities) of components in accordance with the preamble of patent claim 1.

The quality of components manufactured by means of a manufacturing method strongly influences their use properties and service lives. This applies, in particular, to highly stressed components of, for example, a gas-turbine aircraft engine. In this case, the quality of the components relates, in particular, to their dimensional accuracy, their static and dynamic strength, and/or the surface quality in the machined regions.

The sought quality or machining quality of manufactured or machined components can be tested without destruction only with very great effort, with the testing operation generally occurring in time after the manufacturing process. For example, during metal cutting of workpieces by NC machines (drilling, milling, lathing, broaching, grinding), therefore, there exists the need, particularly in serial manufacture, to learn the result of the machining operation in quasi real time without interruption of the machining operation or the entire course of manufacture. However, without special measures and equipment systems, this information may be obtained only by time-consuming and cost-intensive measurements after the conclusion of the machining operation.

The use of such known equipment systems, such as, for example, photo cameras with automatic image processing, is problematic, because they do not have the requisite sensitivity (resolution) for important quality criteria, they represent an obstacle in the operating room of machines, and/or they require special maintenance by specially trained personnel. Of interest for monitoring a manufacturing method, therefore, are methods by means of which conclusions can be drawn in quasi real time about the quality of the manufactured components.

Fundamentally known from practice are methods for the quality-relevant monitoring of a manufacturing method, in which the signal curves of parameters of the manufacturing method are recorded by measuring techniques, wherein several signal curves that are recorded by measuring techniques that may be assigned to a correct and thus qualitatively high-grade manufacturing course are statistically analyzed in order to provide theoretical curves for the signal curves that can be recorded by measuring techniques. Then, for the quality-relevant monitoring of a manufacturing method, actual curves for the signal curves, which are recorded by measuring techniques, are compared with the theoretical curves determined beforehand for the respective manufacturing steps, whereby then, when the actual curves deviate from the theoretical curves by more than a defined measure, this points to the conclusion of a qualitatively poor manufacturing method and thus a quality defect in the manufactured component.

In more concrete terms, in accordance with the prior art, the manufacturing method that is to be monitored in terms of component quality or machining quality is divided into a sequence of individual steps or sections, with, for each individual step, at least one signal template being generated from the control commands of the individual steps and/or from the state variables recorded by measuring techniques.

These signal templates provide theoretical curves for signal curves or time series of parameters of the respective manufacturing method, these signal templates involving either theoretical curves that are determined by calculation, or theoretical curves generated beforehand from real signal curves by way of statistical analyses. This has the advantage that the method of calculation can then be employed for the quality-relevant monitoring of a manufacturing method when components having relatively small lot sizes are to be manufactured using the manufacturing method that is to be monitored, whereas the analytical provision of signal templates finds application more for serial manufacture. The overall course of operation described above finds application, in principle, also in the case of the present invention and is therefore fundamentally applicable to the method of determination according to the invention.

It has been found, however, that particularly the identification of manufacturing quality defects on the basis of signal templates gives rise to appreciable problems in practice. Thus, particularly in the case of complex manufacturing processes as well as when complicated machining tools are used, there is no causal relation between the machining quality to be determined and the signal templates or there is inadequate casual relationship, so that a subsequent correlation consideration during the analysis of the recorded signal curves does not provide clear and thus useable results.

Moreover, the machining qualities of interest at the sites of a component to be machined relate respectively to
- their dimensional accuracy,
- their surface quality,
- and the quality of the respective edge-zone structure.

According to a known method, in which, by means of sensors, certain operating and process parameters are measured in order to determine directly from them or by means of process models the corresponding characteristic values of the technological state of the machining process, largely numerical processing of sensor signals according to different mathematical methods and strategies are already used in diverse manner in real time or quasi real time. However, it is possible only to determine the instantaneous process state (see, for example, U.S. Pat. No. 5,070,655) or the state of wear of tools (see, for example, U.S. Pat. No. 5,251,144). Also known are corresponding methods and devices that, in this case, make do without additional sensors and use information that is acquired from already existing process variables, such as the power of the final drive (e.g., advance feed, spindle torque) without anything further (see for this, for example, U.S. Pat. No. 7,206,657). On the basis of the process states determined online in this manner, it is possible thereby to optimize the process by changing the process parameters. The optimization can take place with different goals, such as, for example, minimal tool wear or minimal machining time (see for this, in particular, U.S. Pat. No. 4,031,368). On account of the problems already discussed, however, an optimization directly according to the aforementioned three key machining qualities is not known.

In view of this prior art, it is a problem of the present invention to provide a method by means of which a determination of at least one of the machining qualities selected preferably from the three machining qualities mentioned is possible in quasi real time.

SUMMARY OF THE INVENTION

This problem is solved by a method having the method steps according to patent claim 1. Advantageous further developments of the method according to the invention are the subject of the dependent claims.

The method according to the invention for determining a selected machining quality of components in a manufacturing process, particularly during metal cutting, accordingly provides at least the following method steps:

determining process-relevant variables through the use of sensors and/or by tapping the data stream in the machine controller of, for example, an NC machine tool, extracting variable curves or time series characteristic for the respective machining process, selecting a number of such characteristics of the extracted variable curves, the linking of which enables a clear assignment to the selected machining quality, and multivariate linking of the selected characteristics to a characteristic pattern correlating with the selected machining quality (qualities).

The method according to the invention, presented concretely above, enables a reduction in costly and time-consuming off-line quality tests in terms of kind and scope. As a result, the testing effort is reduced overall. Furthermore, the quality control can focus on critical cases, resulting in an increase in the quality assurance. Finally, in the framework of an adaptive control of the manufacturing process, it is possible to run the process with only one component characteristic as control variable in order to achieve a process optimization through a change in process parameters.

BRIEF DESCRIPTION OF THE DRAWINGS

The invention will now be described in detail below on the basis of a preferred exemplary embodiment with reference to the accompanying drawings.

DESCRIPTION OF THE INVENTION

As already discussed above, process-relevant variables are recorded (by application of a number of sensors) or determined (by tapping the data stream in the machine controller of, for example, an NC machine tool) for determining selected quality characteristics of components according to the invention, particularly the dimensional accuracy, the surface quality, and the quality of the respective edge-zone structure of the components at the machined sites. These process-relevant variables may be:

motor currents at a feed advance drive for the tool (for example, drill) or at the tool drive itself, rotational speeds and/or torques at the tool, machining time sequences and/or a number of machining operations, etc.

Figure 1:
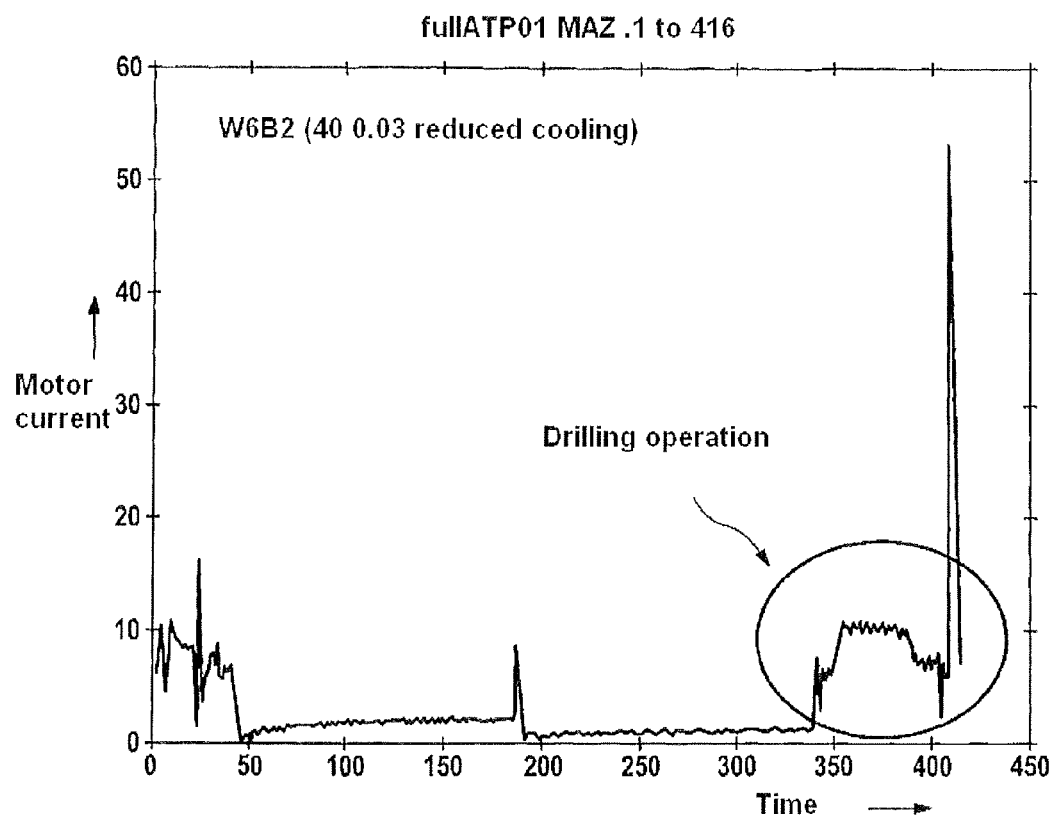
FIG. 1 shows, by way of example, a time series of a motor current of a tool feed advance drive in the case of the manufacturing process "drilling,"

The process-relevant variables are then provided as synchronous time series for the machining in an equipment system according to the invention for digital data processing. FIG. 1 shows, as a preferred example, the motor-current time curve of the z axis (feed advance) of an NC drilling machine. As can be seen here, the motor current curve describes, in a characteristic and thus reproducible manner, the course of drilling, beginning with startup of the machine, placing of the drill bit on the component, metal cutting, and switching off of the coolant supply at the end of the metal cutting.

Figure 2:
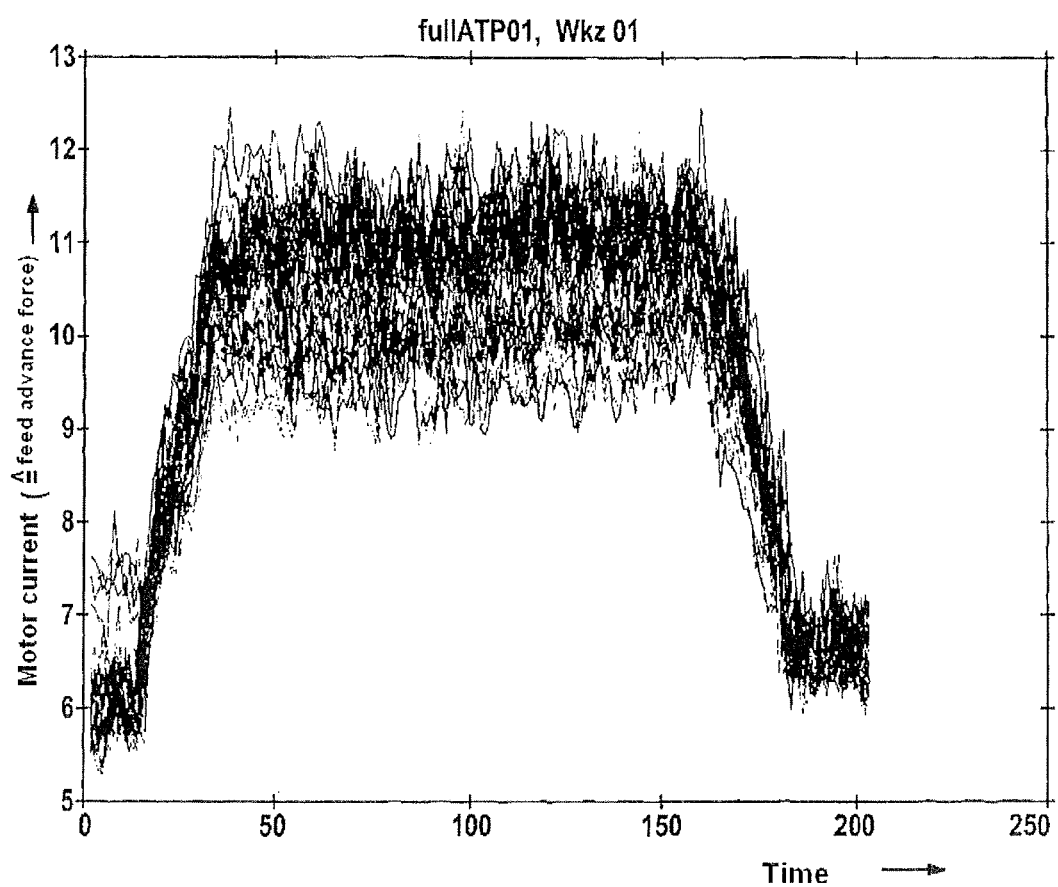
FIG. 2 shows a number of extracted motor current time series of several drilling sequences.

From the time series illustrated in FIG. 1, suitable mathematical methods are used for further analysis to extract those segments in which the tool is engaged with the work piece: that is, the further analysis of the time series focuses essentially only on the aforementioned metal cutting sequence. Illustrated in FIG. 2 for clarity are a number of extracted motor current curves in relation to the metal cutting sequence of several drilling operations.

This extraction takes place by methods of pattern recognition, in which the sought pattern is provided either from a concurrent (partial) modeling of the process or else is determined in off-line mode by modeling or measurement. Both extraction methods are already a part of the prior art according to the literature cited at the beginning, so that reference may be made to the respective publications at this point.

In the present example according to the invention, the extraction is obtained by comparison (cross correlation) of the time series with a (sample) curve that is determined analytically beforehand and is typical for the curve of the respective signal (or of the variable) in the respective machining period. However, as already described, it is also possible to employ for the extraction information that can be obtained from the commands of the NC program commands that belong to the respective machining sequence.

Obtained from the extracted data sequences in the respective time range and/or in the frequency range are a number of characteristics in such a manner and in such a number that, in the case of a suitable linking, they enable a clear conclusion to be drawn about the sought machining quality. In order to achieve this clearness of assignment, a multivariate, preferably nonlinear linking of the obtained characteristics is normally required.

In concrete terms, the time curve of an individual process-relevant variable is, if appropriate, characteristic for the respective machining operation, but is not adequate per se to draw a clear conclusion about a given, selected machining quality. Only when several time series of different process-relevant variables are linked with one another is a correlation of the linking result to the sought machining quality evident.

Figure 3:
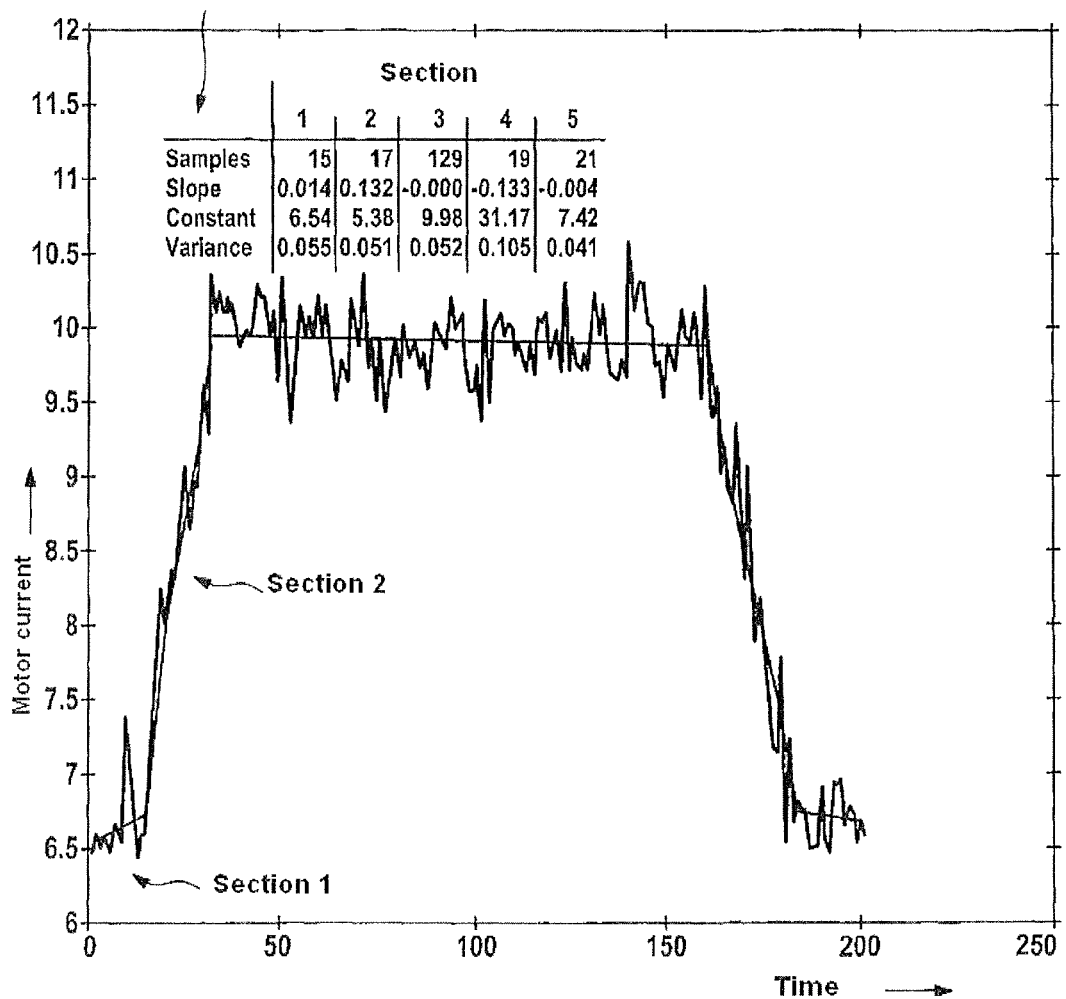
FIG. 3 shows a motor current time series according to FIG. 1 divided into sections.

In the present case, therefore, the extracted time series segments, as shown in FIG. 3, are divided into sections. In doing so, the number of sections is predetermined depending on the respective machining operation. In the example "drilling" of a hole, there are 5 sections.

Then, in the individual sections, the following characteristic values are determined as characteristics by way of example:

the length of the respective section, the mean curve (linear regression coefficients), and the variance of the residues around the regression lines.

The linking of these exemplary characteristics to a characteristic pattern with a clear relation to a sought component machining quality is performed here by way of example by training of a neural network. In doing so, the signal characteristics corresponding to FIG. 3 are recorded for a sequence of drilled holes (in the present example, 34 drilled holes), which were carried out using the same tool. For these drilled holes, the "surface roughness of the drilled wall" was measured as the component of machining quality and used as a target variable for the network training. Next, by means of the neural network trained in this way, the surface roughness was determined by a corresponding correlation method from the linked signal characteristics for further drilled holes and the result was checked on the basis of actually measured values to determine its informative nature.

Figure 4:
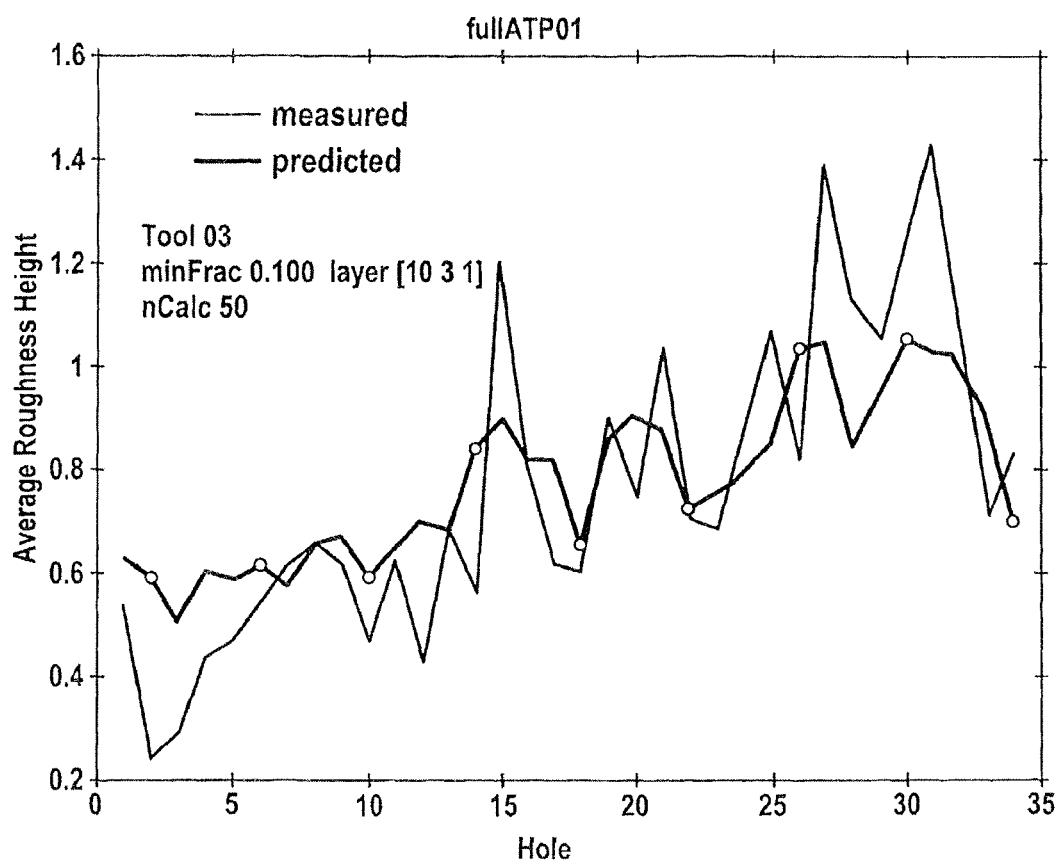
FIG. 4 shows measured surface roughness values as a selected machining quality in comparison to values determined according to the invention.

FIG. 4 shows these actually measured surface roughness values and the values that were determined from the aforementioned characteristics by means of the neural network according to the method of linking characteristics according to the invention.

It can be seen that, with increasing sequence number of the drilled hole (abscissa), the surface roughness tends to increase as a result of the increasing tool wear. This increase may be clearly recognized both for the measured control values and for the predicted values. The deviations between the measured values and the NN results that can be observed in the diagram have as their cause the only limited number of drilling sequences in terms of test technique for the network training, the inaccuracy of the measurement of surface roughness due to the technique, and the incomplete recording of signal characteristics.

The accuracy (correlation quality) achieved here and documented in FIG. 4, however, may already be regarded as being relevant in practice and confirms the fundamental ability of the method according to the invention to determine surface roughness, by way of example, from the above selected and mutually linked signal characteristics.

The invention claimed is:

1. A method for determining a selected machining quality of components in a manufacturing process, particularly during metal cutting, having at least the following method steps:

determining process-relevant variables by sensors and/or from the data stream in the machine controller; the process-relevant variables being motor currents, rotational speeds and/or cutting forces;

creating a time series for each of the process-relevant variables;

extracting variable curves characteristic for the respective machining process from the time series for at least two of the process-relevant variables, wherein selecting a number of different characteristics of the extracted variable curves, with the characteristic variable curves being divided into a number of sections, with the respective lengths of the sections, the linear regression coefficients, and the variance of the residues around the regression lines being selected as characteristics, and multivariate linking of the selected characteristics to a characteristic pattern correlating with the selected machining quality.

2. The method according to claim 1, wherein the dimensional accuracy of the component, the surface quality, and/or the quality of the edge-zone structure is selected as the machining quality.

3. The method according to claim 1, wherein the extraction of the characteristic variable curve(s) is obtained through a comparison of the time series obtained from the determined variables with a sample curve, which is either calculated mathematically as a theoretical curve or is determined beforehand analytically via a number of test runs.

4. The method according to claim 1, wherein the linking of the characteristics to form a characteristic sample is performed by training a neural network, with the linking taking place nonlinearly.

* * * * *